(12) United States Patent
Ripplinger et al.

(10) Patent No.: US 11,473,012 B2
(45) Date of Patent: Oct. 18, 2022

(54) ARTICLE OF MANUFACTURE USING AN INDUSTRIAL OR COMMERCIAL MANUFACTURING PROCESS, WHEREIN THE ARTICLE OF MANUFACTURE COMPRISES AN INFRARED (IR) PHOSPHORESCENT MATERIAL

(71) Applicant: Battle Sight Technologies, LLC, Dayton, OH (US)

(72) Inventors: Nicholas R. Ripplinger, Springboro, OH (US); Christopher J. Vogt, Cincinnati, OH (US)

(73) Assignee: Battle Sight Technologies, LLC, Dayton, OH (US)

( * ) Notice: Subject to any disclaimer, the term of this patent is extended or adjusted under 35 U.S.C. 154(b) by 344 days.

(21) Appl. No.: 16/912,167

(22) Filed: Jun. 25, 2020

(65) Prior Publication Data

US 2020/0325397 A1 Oct. 15, 2020

(51) Int. Cl.

| | |
|---|---|
| *C08L 27/06* | (2006.01) |
| *C09K 11/02* | (2006.01) |
| *C09K 11/88* | (2006.01) |
| *C09D 5/22* | (2006.01) |
| *C08K 3/01* | (2018.01) |
| *A41D 29/00* | (2006.01) |

(Continued)

(52) U.S. Cl.
CPC .............. *C09K 11/886* (2013.01); *C08K 3/01* (2018.01); *C08L 27/06* (2013.01); *C09D 5/22* (2013.01); *C09K 11/02* (2013.01); *A41D 29/00* (2013.01); *C09K 11/623* (2013.01); *C09K 11/7414* (2013.01); *C09K 11/7702* (2013.01)

(58) Field of Classification Search
CPC ....... C08L 27/06; C09K 11/886; C09K 11/77; C09K 11/7702
USPC .................................. 428/690, 518
See application file for complete search history.

(56) References Cited

U.S. PATENT DOCUMENTS 5,374,377 A * 12/1994 Nguyen ................. C09K 11/02
252/301.36
6,110,566 A * 8/2000 White .................... G02B 5/128
404/94

(Continued)

FOREIGN PATENT DOCUMENTS

| KR | 200308793 Y1 * | 3/2003 | ............. B32B 27/20 |
|---|---|---|---|
| WO | 2004/077018 A2 | 9/2004 | |

(Continued)

OTHER PUBLICATIONS

KR 200308793 Y1 (Mar. 28, 2003); machine translation. (Year: 2003).*

*Primary Examiner* — Rip A Lee
(74) *Attorney, Agent, or Firm* — Thomas E. Lees, LLC

(57) ABSTRACT

This invention is a commercially manufactured article of manufacture (such as a shoulder patch) comprising an infrared (IR) phosphorescent material that emits in the IR wavelength range (e.g., from approximately seven-hundred nanometers (~700 nm) to approximately one millimeter (~1 mm)) after being excited by incident wavelengths of between ~100 nm and ~750 nm (or visible light). In other words, once the material has been exposed to visible light, the material will continue to emit in the IR wavelength range for a period of time, even when the material is no longer exposed to the visible light.

3 Claims, 1 Drawing Sheet

(51) Int. Cl.
*C09K 11/77* (2006.01)
*C09K 11/62* (2006.01)
*C09K 11/74* (2006.01)

(56) References Cited

U.S. PATENT DOCUMENTS

| | | |
|---|---|---|
| 6,117,362 A | 9/2000 | Yen et al. |
| 6,267,911 B1 | 7/2001 | Yen et al. |
| 6,953,536 B2 | 10/2005 | Yen et al. |
| 7,976,727 B1 * | 7/2011 | Naik .................. C09K 11/623 252/301.4 R |
| 8,329,061 B2 | 12/2012 | Jia |
| 8,932,486 B2 | 1/2015 | Jia |
| 9,683,169 B2 | 6/2017 | Jia |
| 2004/0164277 A1 | 8/2004 | Yen et al. |
| 2009/0095940 A1 | 4/2009 | Meltzer et al. |
| 2011/0012059 A1 | 1/2011 | Jia |
| 2012/0256126 A1 | 10/2012 | Jia |
| 2015/0102262 A1 | 4/2015 | Jia |
| 2017/0275533 A1 | 9/2017 | Jia |
| 2019/0256769 A1 | 8/2019 | Jia et al. |

FOREIGN PATENT DOCUMENTS

| | | |
|---|---|---|
| WO | 2011/008930 A2 | 1/2011 |
| WO | 2015/053932 A1 | 4/2015 |
| WO | 2019/165211 A1 | 8/2019 |

* cited by examiner

ARTICLE OF MANUFACTURE USING AN INDUSTRIAL OR COMMERCIAL MANUFACTURING PROCESS, WHEREIN THE ARTICLE OF MANUFACTURE COMPRISES AN INFRARED (IR) PHOSPHORESCENT MATERIAL

BACKGROUND

Field of the Disclosure

The present disclosure relates generally to phosphorescent material and, more particularly, to an infrared (IR) phosphorescent material.

Description of Related Art

For members of the military, it is important to be visible to friendly allies (also designated as "friendlies") while concurrently being invisible to hostile enemies (also designated as "hostiles"). Even during daylight hours, when there is clear visibility, it is sometimes difficult to visually distinguish between friendlies and hostiles. When there is low light (or even no light), this difficulty approaches practical impossibility.

SUMMARY

The present invention is an article of manufacture that is manufactured using an industrial (or commercial) manufacturing process. The article of manufacture comprises an infrared (IR) phosphorescent material that emits in the IR wavelength range (e.g., from approximately seven-hundred nanometers (~700 nm) to approximately one millimeter (~1 mm)) after being excited by incident wavelengths of between ~100 nm and ~750 nm (or visible light). In other words, once the material has been exposed to the visible light, the material will continue to emit in the IR wavelength range for a period of time, even when the material is no longer exposed to the visible light.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1A:
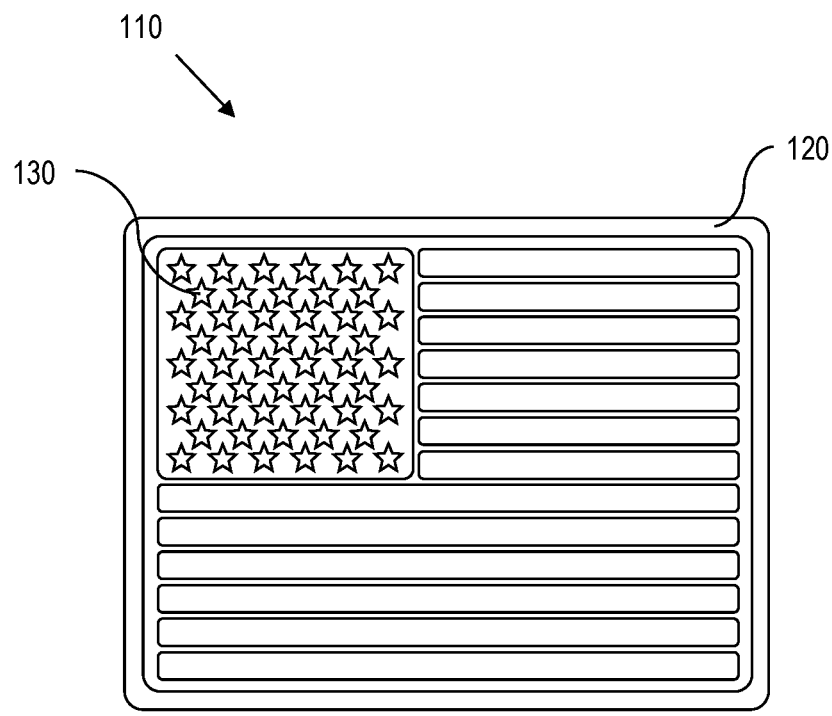
FIG. 1A is a diagram showing a front view of an article of manufacture (namely, a shoulder patch) that is manufactured using an industrial manufacturing process, wherein the article of manufacture comprises a substrate and an infrared (IR) phosphorescent material operatively coupled to the substrate.

As one can imagine, during combat it is important to be visible to friendly allies (also designated as "friendlies") while concurrently being invisible to hostile enemies (also designated as "hostiles"). Even during daylight hours when there is clear visibility, it is sometimes difficult to visually distinguish between friendlies and hostiles. The distinction becomes practically impossible during low-light or no-light conditions (e.g., night). Additionally, during nighttime operations when there is little to no visibility, personnel recovery becomes difficult and locating an isolated person in low-light or no-light conditions becomes a herculean task.

To address this problem, this invention is an article of manufacture (such as a shoulder patch) that is made using an industrial (or commercial) manufacturing process. The industrially-manufacturable shoulder patch comprises an infrared (IR) phosphorescent material that emits in the IR wavelength range when it has been exposed to visible light (which is expressly defined herein as covering a wavelength range from approximately one-hundred nanometers (~100 nm) to approximately seven-hundred-and-eighty nanometers (~780 nm)). Specifically, the shoulder patch is an injection-molded flexible polyvinyl chloride (PVC) patch with the IR phosphorescent material. The patch is affixed to a uniform (e.g., using a hook-and-loop fastener). Thus, if an individual (e.g., soldier or other military personnel) wears the patch during daylight hours, then the patch stores the energy from the sunlight and emits the stored energy in the IR wavelength range. These IR emissions make the individual virtually invisible to the naked eye when it becomes dark, but visible to those having IR detectors (such as night vision goggles). The inventive IR phosphorescent material comprises a ceramic-based IR phosphorescent powder that is incorporated into any number of commercial products or commercial processes.

Also, unlike currently available active markers, such as signal beacons that require a battery or other power source, the disclosed IR phosphorescent materials are passive and therefore provide continuous, perpetually rechargeable, customizable, and lightweight solutions for finding isolated persons, combat search and rescue operations, or personnel recovery in low-to-no light conditions.

Having provided a technical solution to a technical problem, reference is now made in detail to the description of the invention as illustrated in the drawings.

Figure 1B:
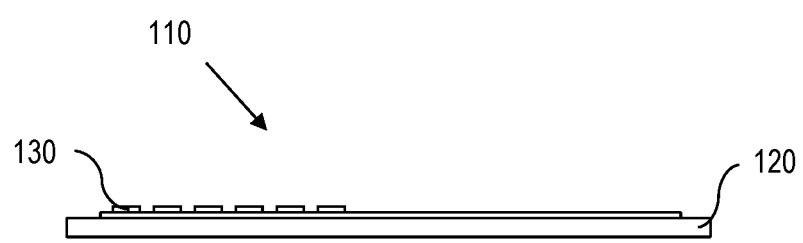
FIG. 1B is a diagram showing a side view of the shoulder patch of FIG. 1A.

FIGS. 1A and 1B (collectively designated as "FIG. 1") show an article of manufacture 110 that is manufactured using an industrial or commercial process. Specifically, the article of manufacture 110 in FIG. 1 is a shoulder patch that resists degradation in temperatures that range from approximately negative forty degrees Fahrenheit (−40° F.) to approximately one-hundred-and-sixty-five degrees Fahrenheit (165° F.). As shown in FIG. 1, the shoulder patch comprises a substrate 120 that does not exhibit infrared (IR) phosphorescence. The substrate 120 is a first injection-molded polyvinyl chloride (PVC) material that is flexible and formed in a multi-component injection-molding process.

The shoulder patch further comprises an IR phosphorescent material 130 that is formed atop the substrate 120 in the multi-component injection-molding process, wherein the IR phosphorescent material is a second injection-molded PVC material. The second PVC material is flexible and phosphoresces for longer than four (4) hours after being exposed to approximately fifteen (~15) minutes of visible light.

The shoulder patch can be affixed to a uniform (e.g., using a hook-and-loop fastener). As shown in FIG. 1, the injection-molded flexible PVC patch comprises a non-IR phosphorescent substrate 120 that provides a background, while the IR phosphorescent material 130 forms an elevated or raised-relief pattern of the flag of the United States of America on the substrate 120. Thus, when viewed using an IR detector, the patch illuminates the United States flag pattern because the IR phosphorescent material 130 forms the stars and white stripes of the United States flag.

When the patch is affixed to a uniform, the patch identifies, to a certain extent, a soldier or other individual donning that uniform. As such, when the individual wears the patch during daylight hours, the patch stores energy from sunlight and emits the stored energy in an IR wavelength range. Because IR wavelengths are virtually invisible to the naked (or unaided) eye, the individual becomes effectively invisible to the naked eye when darkness falls. However, that same individual becomes visible to those having an IR detector due to the IR phosphorescent material 130 on the patch.

The IR phosphorescent material 130 comprises a ceramic-based IR phosphorescent powder having a chemical composition of either:

(a) $Zn_{0.96}SbGaTe_{0.1}O_{4.15}N_{0.05}$:3% $Cr^{3+}$, 1% $Nd^{3+}$, wherein Zn represents Zinc, Sb represents Antimony, Ga represents Gallium, Te represents Tellurium, O represents Oxygen, N represents Nitrogen, Cr represents Chromium, and Nd represents Neodymium; or (b) $Zn_{0.96}SbGaTeO_{5.95}N_{0.05}$:3% $Cr^{3+}$, 1% $Nd^{3+}$.

Preferably, the IR phosphorescent material 130 emits in an IR wavelength range that is between approximately seven hundred nanometers (~700 nm) and approximately one millimeter (~1 mm), which is the IR wavelength range on the electromagnetic (EM) spectrum. However, in other contexts, the IR phosphorescent material 130 emits at:

(a) a wavelength range that is between approximately 700 nanometers (~700 nm) to approximately one millimeter (~1 mm);

(b) a wavelength range that is between approximately nine-hundred-and-twenty (~920 nm) to approximately 1550 nanometers (~1550 nm);

(c) a wavelength range that is near infrared (NIR);

(d) a wavelength range that is short-wave infrared (SWIR);

(e) a wavelength that is centered at approximately seven-hundred-and-sixty nanometers (~760 nm);

a wavelength that is centered at approximately nine-hundred-and-twenty nanometers (~920 nm);

(g) a wavelength that is centered at approximately nine hundred nanometers (~900 nm); or (h) a wavelength that is centered at approximately one-thousand-five-hundred-and-fifty nanometers (~1550 nm).

As a ceramic-based IR phosphorescent industrial powder, the IR phosphorescent material provides a passive source of IR emissions. Thus, the powder allows for continuous, perpetually rechargeable, customizable, and lightweight solutions that do not require a heavy power source (e.g., battery or power cell). Furthermore, because the powder can be crushed or pulverized into microscopic or sub-microscopic particle sizes, they can be readily incorporated into resins that are used in the industrial (or commercial) injection-molding processes for manufacturing the shoulder patch 110.

The long persistence and customizable wavelengths result in the IR phosphorescent materials being detectable from great distances, sometimes beyond one kilometer (1 km), which permits aerial detection, drone-based detection, or (in some cases) even satellite-based detection.

As noted above, some of the military uses of the IR phosphorescent materials include isolated personnel identification, personnel recovery, and combat search and rescue operations. Because of their properties, the IR phosphorescent materials are also suitable for a host of civilian uses. For example, as one having ordinary skill in the art will appreciate, there are widespread applications for law enforcement, border security, emergency management, coast guard search and rescue, fish and wildlife enforcement, and a host of other fields in which personnel operate in low-light or no-light conditions. Moreover, the IR phosphorescent materials can serve as lightweight, rechargeable location markers for campers, hikers, or other adventurers that spend extended periods of time outdoors.

What is claimed is:

1. An article of manufacture, wherein the article of manufacture is manufactured by an industrial or commercial process, wherein the article of manufacture resists degradation in temperatures that range from approximately negative forty degrees Fahrenheit (−40° F.) to approximately one-hundred-and-sixty-five degrees Fahrenheit (165° F.), wherein the article of manufacture comprises:

a substrate that does not exhibit infrared (IR) phosphorescence, wherein the substrate is a first injection-molded polyvinyl chloride (PVC) material that is formed in a multi-component injection-molding process, wherein the first injection-molded PVC material is flexible; and an IR phosphorescent material that is formed atop the substrate in the multi-component injection-molding process, wherein the IR phosphorescent material is a second injection-molded PVC material, wherein the second injection-molded PVC material is flexible, wherein the IR phosphorescent material phosphoresces for longer than four (4) hours after being exposed to visible light, wherein the IR phosphorescent material is detectable from a distance of greater than approximately one kilometer (~1 km), wherein the IR phosphorescent material comprises an emission wavelength, wherein the emission wavelength is one selected from the group consisting of:

a wavelength range that is between approximately 700 nanometers (~700 nm) to approximately one millimeter (~1 mm);

a wavelength range that is between approximately nine-hundred-and-twenty (~920 nm) to approximately 1550 nanometers (~1550 nm);

a wavelength range that is near infrared (NIR);

a wavelength range that is short-wave infrared (SWIR);

a wavelength that is centered at approximately seven-hundred-and-sixty nanometers (~760 nm);

a wavelength that is centered at approximately nine-hundred-and-twenty nanometers (~920 nm);

a wavelength that is centered at approximately nine hundred nanometers (~900 nm); and a wavelength that is centered at approximately one-thousand-five-hundred-and-fifty nanometers (~1550 nm).

2. The article of manufacture of claim 1, wherein the IR phosphorescent material comprises a ceramic-based IR phosphorescent powder having a chemical composition of $Zn_{0.96}SbGaTe_{0.1}O_{4.15}N_{0.05}$:3% $Cr^{3+}$, 1% $Nd^{3+}$, wherein Zn represents zinc, Sb represents antimony, Ga represents gallium, Te represents tellurium, O represents oxygen, N represents nitrogen, Cr represents chromium, and Nd represents neodymium.

3. The article of manufacture of claim 1, wherein the IR phosphorescent material comprises a ceramic-based IR phosphorescent powder having a chemical composition of $Zn_{0.96}SbGaTeO_{5.95}N_{0.05}$:3% $Cr^{3+}$, 1% $Nd^{3+}$, wherein Zn represents zinc, Sb represents antimony, Ga represents gallium, Te represents tellurium, O represents oxygen, N represents nitrogen, Cr represents chromium, and Nd represents neodymium.

\* \* \* \* \*